(12) United States Patent
Brickell

(10) Patent No.: US 6,285,017 B1
(45) Date of Patent: Sep. 4, 2001

(54) ALIGNMENT INDICATOR FOR PHOTOELECTRIC SENSORS

(75) Inventor: Christopher Gavin Brickell, Mukilteo, WA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/336,519

(22) Filed: Jun. 18, 1999

(51) Int. Cl.[7] .................................................. H01J 40/14
(52) U.S. Cl. ............... 250/214 A; 250/221; 250/214 AL
(58) Field of Search .................. 250/221, 214 A, 250/214 AL

(56) References Cited

U.S. PATENT DOCUMENTS

| | | | |
|---|---|---|---|
| 4,356,393 | * 10/1982 | Fayfield | 250/214 R |
| 5,255,117 | * 10/1993 | Cushman | 250/233 |
| 5,644,730 | * 7/1997 | Fayfield | 395/282 |
| 5,777,557 | * 7/1998 | Fayfield | 340/635 |
| 5,862,907 | 1/1999 | Taylor . | |

OTHER PUBLICATIONS

*Engineer's Notebook: A Handbook of Integrated Circuit Applications,* Forrest M. Mims, III (Copyright 1979).

* cited by examiner

*Primary Examiner*—Frank G. Font
*Assistant Examiner*—Roy M. Punnoose
(74) *Attorney, Agent, or Firm*—George E. Hass; Quarles & Brady LLP

(57) ABSTRACT

A mechanism for indicating the degree of alignment of a photoelectric sensing system produces a pulse width modulated signal in response to the intensity of light received by the sensing system. That signal has pulses which occur at a fixed frequency, but which vary in duration in response to the received light intensity. The pulse width modulated signal drives an indicator, such as a sound or light emitter. With this technique, the output of the indicator is pulse width modulated to indicate the intensity of the received light and thus the degree of alignment of the sensing system.

18 Claims, 4 Drawing Sheets

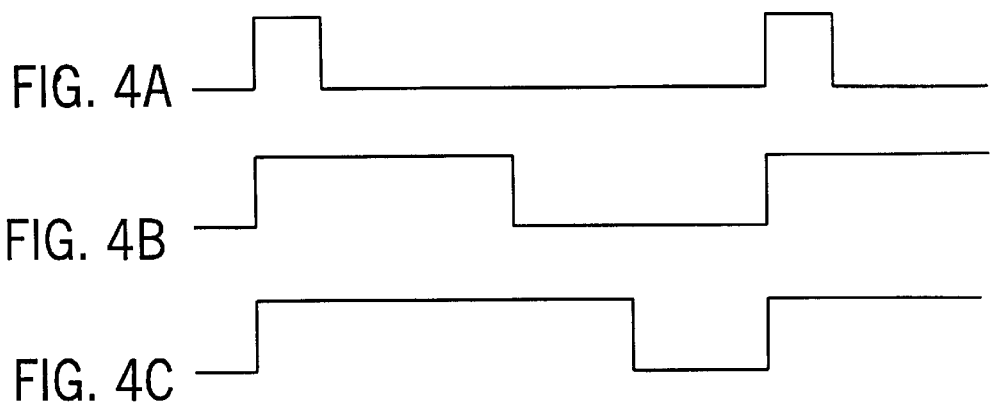
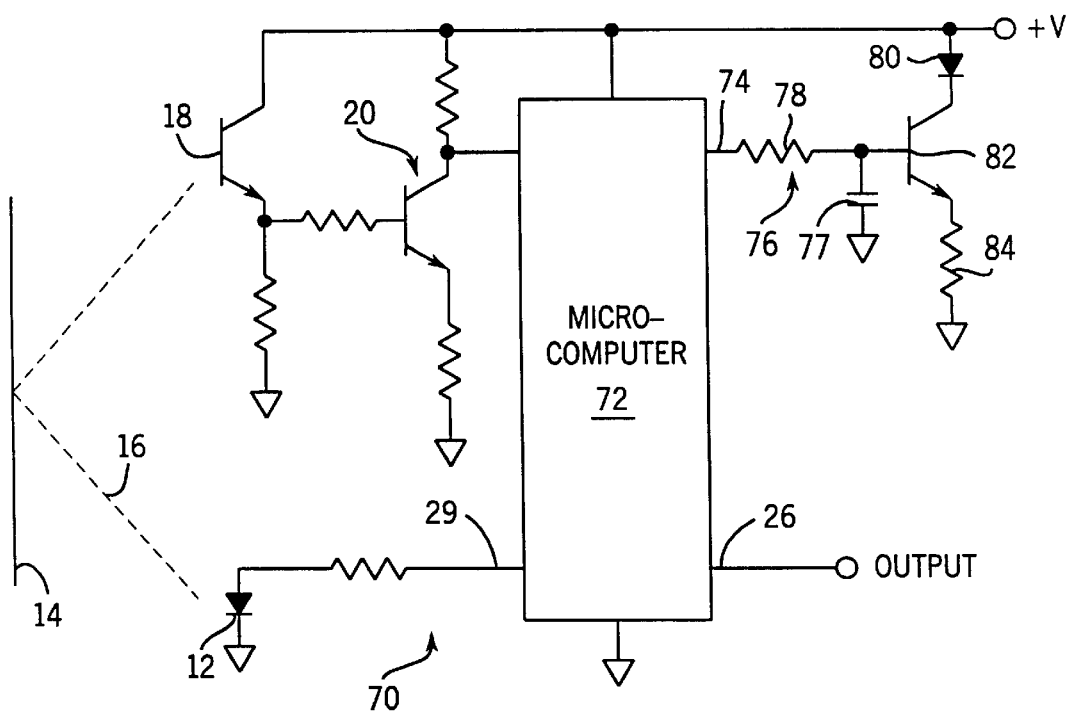
FIG. 5

ALIGNMENT INDICATOR FOR PHOTOELECTRIC SENSORS

TECHNICAL FIELD

This invention relates generally to photoelectric sensors, and in particular to mechanisms for determining and indicating alignment of a photoelectric receiver with a light beam.

BACKGROUND OF THE INVENTION

Photoelectric sensors are widely used in industry for a variety of measurement and control functions, based upon breaking or restoring of a light beam emitted and received by the sensor system. Examples include counting objects moving along a conveyor, determining the size of objects, detection of a machine part moving into a predetermined position, and countless other applications in many different industries.

Photoelectric sensors can be of two general types. In one type, a single housing contains both a light emitter and a light detector. A reflective target is used to rebound the beam from the emitter back to the detector across the path of objects of be detected. The other type employs an emitter and a detector in separate housings which are placed on opposite sides of the objects' path, with the beam being transmitted directly from the emitter across the path to the detector.

In all types of photoelectric systems some method of indicating accurate alignment of the optical path is required to aid in the correct positioning of the elements for proper operation. A common alignment technique utilizes an indicating lamp or LED with circuitry that illuminates the indicator when the scanning beam from the emitter is aligned with the receiver. The lamp or LED turns off when the beam is broken or misaligned with the receiver. When installing a system, the emitter, receiver and reflecting target, if any, are positioned so that the indicating lamp or LED turns on, at which time the components are secured in place.

While this type of mechanism is useful in achieving alignment in many instances, it is unfortunately subject to certain disadvantages and difficulties. The most common difficulty is that the indicator does not signal the degree of beam alignment with the receiver, but instead only indicates that the alignment is adequate to permit light beam detection under the conditions prevailing at that time. However, it is common to have a situation where the alignment is only marginal at the time of the installation, and thereafter a small amount of vibration, dirt buildup or drift of the amplifier electronics causes a system malfunction.

U.S. Pat. No. 4,356,393 discloses an alignment system that provides an indication of the degree of alignment of the photo-sensing components. Specifically, a light or sound source is pulsed at a frequency that varies with the intensity of the received light from the sensing beam. Thus the greater the frequency, i.e. the faster the light flashes or the beeps occur, the better is the alignment of the sensing components.

Another alignment approach is found in U.S. Pat. No. 5,243,181 in which the intensity of the received sensing signal reducing towards the detection threshold of the system is detected by a logic circuit which provides an indication of the marginal signal. This process only operates near the threshold of detection and is facilitated by the inevitable noise in any low level signal.

SUMMARY OF THE INVENTION

The present invention overcomes these difficulties by providing a mechanism that is operative to indicate the degree of alignment of the receiver to the beam, so that optimal alignment can be achieved and situations of marginal alignment can be avoided.

This application varies the duration of indicator activation at a constant frequency relative to the intensity of the received light. The process of varying duration of a pulse while holding the frequency constant is termed Pulse Width Modulation, referenced hereinafter as PWM.

This is accomplished by a photoelectric detecting and indicating apparatus which includes a light detector that receives light and responds by producing a detector signal indicative of intensity of the received light. A control circuit processes the detector signal and produces an output signal that has a constant frequency and pulses which vary in duration with the intensity of the received light. An indicator is driven by the output signal and produces a repetitive indication whereby the intensity of the received light may be discerned.

In the preferred embodiment, the indicator may be either a light or sound emitter. In the case of a light emitter, flashes of light are produced which occur at a constant rate, but which vary in duration as a function of the intensity of the received light. Similarly the sound emitter produces audible pulses at a constant rate, but which vary in duration as a function of the received light intensity.

Thus with this approach the output of the indicator is pulse width modulated to indicate the intensity of the receiver light and thus the degree of alignment of the photoelectric detecting and indicating apparatus.

BRIEF DESCRIPTION OF THE DRAWINGS

FIGS. 4A–4C show waveforms representative of the PWM signal supplied to the alignment indicator;

FIG. 5 is another alternative photoelectric sensor system with an alignment indicator demonstrating microcomputer based PWM.

DETAILED DESCRIPTION OF THE INVENTION

Figure 1:
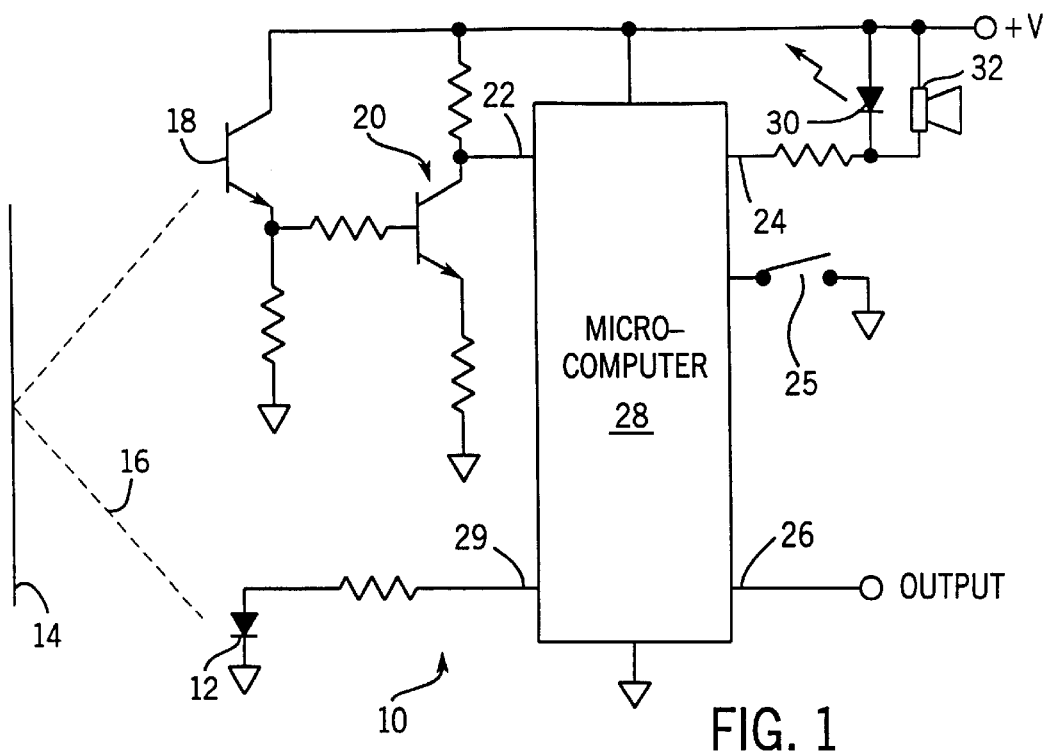
FIG. 1 is a schematic diagram of a photoelectric sensor system including an alignment indicator according to the present invention.

With initial reference to FIG. 1, a sensing system 10, comprises an emitter 12, such as a light emitting diode for example, which produces a light beam 16 that is denoted by a broken line. The light beam 16 is reflected by a target 14 and the reflected beam impinges a photodetector 18. The emitter 12, target 14 and photodetector 18 are arranged so that objects to be detected pass through and interrupt the light beam 16. The angle between the incident and reflected portions of the light beam may be very small so that the objects interrupt both beam portions almost simultaneously. In this embodiment the emitter 12 and the photodetector 18 typically are mounted in a common housing above and below each other.

Activation of the light emitter 12 is governed by a control circuit that includes a microcomputer 28 with a first output terminal 29 to which the emitter is connected. The microcomputer 28 is any one of several commercially available devices that contain a microprocessor, input/output circuits, and memory for storing the software that performs the alignment function, as will be described. The photodetector 18 preferably is a phototransistor, but other types of well known photosensors, such as a photodiode, may be used with corresponding changes to the control circuit, as described in the book by Jerald Graeme entitled *Photodiode Amplifiers* published by McGraw Hill. The electrical signal produced by the photodetector 18 is amplified to a useable level by amplifier 20 of the control circuit and applied to an input terminal 22 of a microcomputer 28. The input terminal 22 is connected to an internal analog to digital converter which digitizes the input signal level.

As will be described, the sensing system 10 has an alignment mode in which the microcomputer 28 periodically activates the light emitter 12 and senses the intensity, of the light received by the photodetector 18. In response to the sensed intensity the microcomputer 28 applies a pulsed signal to second output terminal 24 wherein the signal has a duty cycle that varies as a function of the intensity. The second output terminal 24 is connected to a light emitting diode 30 or other light emitter that provides a visual alignment indication to the user. Alternatively, a sound emitter 32, such as a piezoelectric transducer, can be coupled to the second output terminal 24 to provide an alignment indication. A third output terminal 26 is provided to emit a signal during normal operation of the sensing system 10 that indicates the presence of an object being sensed.

Figure 2:
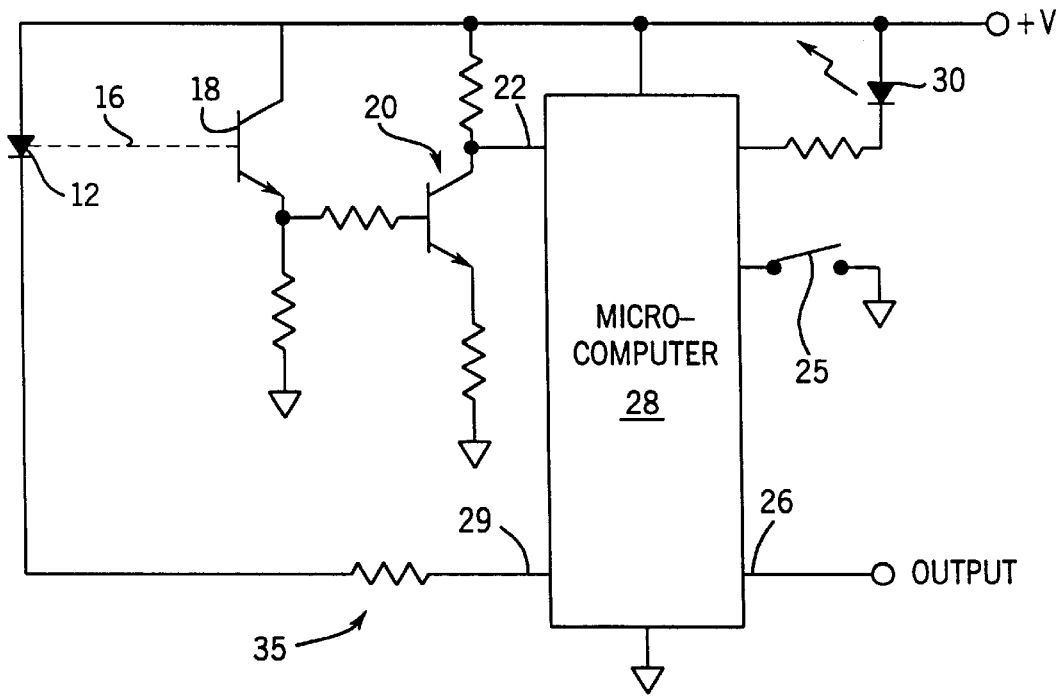
FIG. 2 is an alternative arrangement for the sensing components of the photoelectric sensor system.

FIG. 2 illustrates a sensing system 35 that is electrically identical to sensing system 10. However, sensing system 35 does not employ a reflective target 14. Instead the light beam 16 from the emitter 12 travels directly to the photodetector 18 across the path of the objects to be sensed. In this embodiment, the emitter 12 and photodetector 18 are in separate housings.

Regardless of whether the system is configured as shown in FIGS. 1 or 2, it is necessary for effective operation to align emitter 12, photodetector 18 and target 14. To accomplish this the sensing system 10 is placed into the alignment mode by the user closing a mode switch 25. This action signals the microcomputer 28 to commence executing an alignment software routine. Alternatively by omitting the mode switch 25, the alignment routine could be active at all times.

The alignment routine periodically responds to the intensity of the light received by photodetector 18. In response, light or sound emitter 30 or 32 is pulsed on and off at a constant frequency and variable on-time, referred to a pulse width modulation (PWM). Thus, as intensity of light beam at the photodetector 18 increases, the on-time of the alignment indicator also increases towards 100%.

Figure 3:
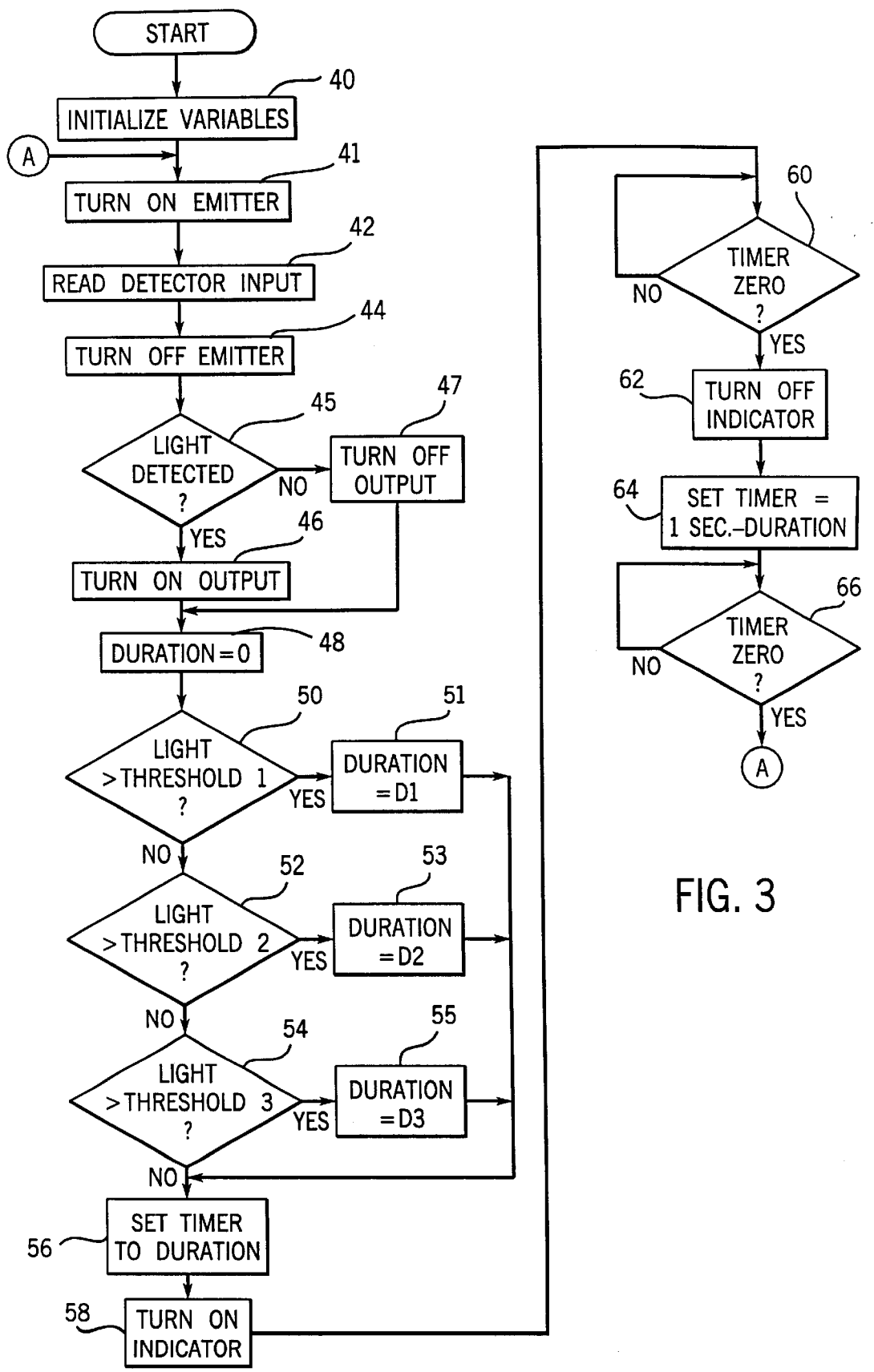
FIG. 3 depicts a flowchart of an alignment software routine that is executed by a control circuit in FIGS. 1 and 2.

With reference to the flowchart of FIG. 3, the routine including the alignment process commences at step 40 where variables utilized during execution are initialized and stored in the internal memory of the microprocessor 28. Then at step 41, the light beam emitter 12 is turned on by producing a high logic level at the first output terminal 29. Thereafter, microprocessor 28 reads the level of the signal at input terminal 22 at step 42 to determine the intensity of light which has been received by photodetector 18. A sample or multiple samples of the input signal level is acquired during a given sampling period, (e.g. 100 µsec) and then utilized as representing the received light intensity. The microprocessor 28 then turns off the emitter 12 by asserting a low logic level at the first output terminal 29.

Next at step 45, the microprocessor 28 examines the light intensity level to detect whether it is above a threshold, as occurs when the light beam 16 is actually received. If that is the case, the third output terminal 26 is set high at step 46 to indicate reception of the light beam. Otherwise, the program execution branches through step 47 where the third output terminal 26 is held low as an indication of light not being received.

Program execution by the microcomputer 28 next enters a section which sets the length of time of a drive pulse for the alignment indicators 30 and 32. First at step 48, a variable named DURATION is set to zero which is a default pulse length that does not activate the alignment indicators. Thereafter, the light intensity from photodetector 18 is compared to three different thresholds of decreasing values to determine how long an interval the alignment indicators 30 and 32 should be activated. Therefore, a determination is made at step 50 whether the light intensity is brighter than THRESHOLD1 which is the greatest threshold level. If that determination is true, the DURATION variable is set to the longest pulse interval D1 at step 51 and the program execution advances to step 56. Otherwise a second comparison is performed at step 52 where a determination is made whether the light intensity is greater than a lower THRESHOLD2. When that occurs, the DURATION variable is set to a shorter length D2 at step 53 before advancing to step 56. Otherwise when the light intensity exceeds a still lower THRESHOLD3 at step 54, the DURATION variable is set to a still shorter time interval D3 at step 55. If the light intensity is below the lowest THRESHOLD3 level, the value of DURATION remains at zero from step 48 when the program execution reaches step 56.

It should be understood that a greater number of thresholds may be employed to provide finer gradation of the indication signal produced by the sensing system 10. As an alternative to multiple threshold comparisons, the value of DURATION can be set by determining the percentage that the detected light beam intensity is of the maximum intensity value. DURATION then is set to that percentage of the maximum indicator pulse length.

Next the program has a section which forms a pulse width modulator. At step 56, a timer within the microcomputer 28 is initialized with the value of the DURATION variable so as to time that interval. Then a low logic level is applied to the second output terminal 24 at step 58, thereby turning on the indicator device, either LED 30 or sound emitter 32. The program execution then advances to step 60 where the timer is inspected to determine if it has elapsed, that is reached a zero value. If not, the program execution continues looping through step 60. When the timer indicates that the interval set by variable DURATION has expired, step 62 is executed where the indicator device is turned off by applying a high logic level to the second output terminal 24.

At step 64 the timer is reinitialized to a value which corresponds to the result of subtracting the value of the DURATION variable from one second, thereby maintaining the frequency constant. The program then loops through step 66 until the timer has expired, at which point the program execution returns to step 41 to repeat the alignment procedure.

In this exemplary procedure, the sensor beam 16 is produced by the emitter 12 once a second and the microcomputer 28 detects whether the photodetector 18 has received the light beam. In response to the intensity of the received light, the indicator device 30 or 32 is turned on for a period of time within that one second interval which corresponds to the intensity of the light beam received by the photodetector 18. Thus, the sensing cycle and the indicator signal have a fixed period of one second and a constant frequency of one Hertz. However, the duration of the indication, either light from LED 30 or sound from emitter 32, produced during that one second period varies as a function of intensity of the light beam 16 received by the photodetector 18. In other words, the alignment indication produced by system 10 is pulse width modulated wherein the duty cycle of the indication signal has a direct relationship to the received light intensity. The more aligned the sensing components 12, 14, and 18 become the more intense will be the indication signal produced by devices 30 and 32.

In this example, where the alignment indication frequency is set to one Hertz, if the light beam 16 is not received, the indicator on-time is set to zero, i.e. the indicators 30 and 32 are substantially off. When the received light beam intensity becomes one-fifth the maximum level, the indicators 30 and 32 are activated for one-fifth second (20%), as shown in FIG. 4A. A received light beam intensity of half the maximum level produces an indicator on-period of half a second (50%) as seen in FIG. 4B; and the on-time of indicators 30 and 32 is set to 0.8 second when the light intensity of the light beam 16 reaches 80% of the maximum value, as shown in FIG. 4B.

Thus the LED 30 operation can be interpreted as a short flash corresponding to a low light beam intensity, and a longer flash as a relatively higher light beam intensity. The waveforms in FIGS. 4A–4C repeat at the same frequency, which is set to a value suitable for viewing, for example a repetition rate of once per second. Because the human eye has a tendency to integrate short duration events, it is appropriate that the pulses of light are of a relatively long duration, a minimum of 0.1 second for example, so as to be perceived by the eye as an analytic event and not merely as an event of a non-analytic nature.

Figure 6:
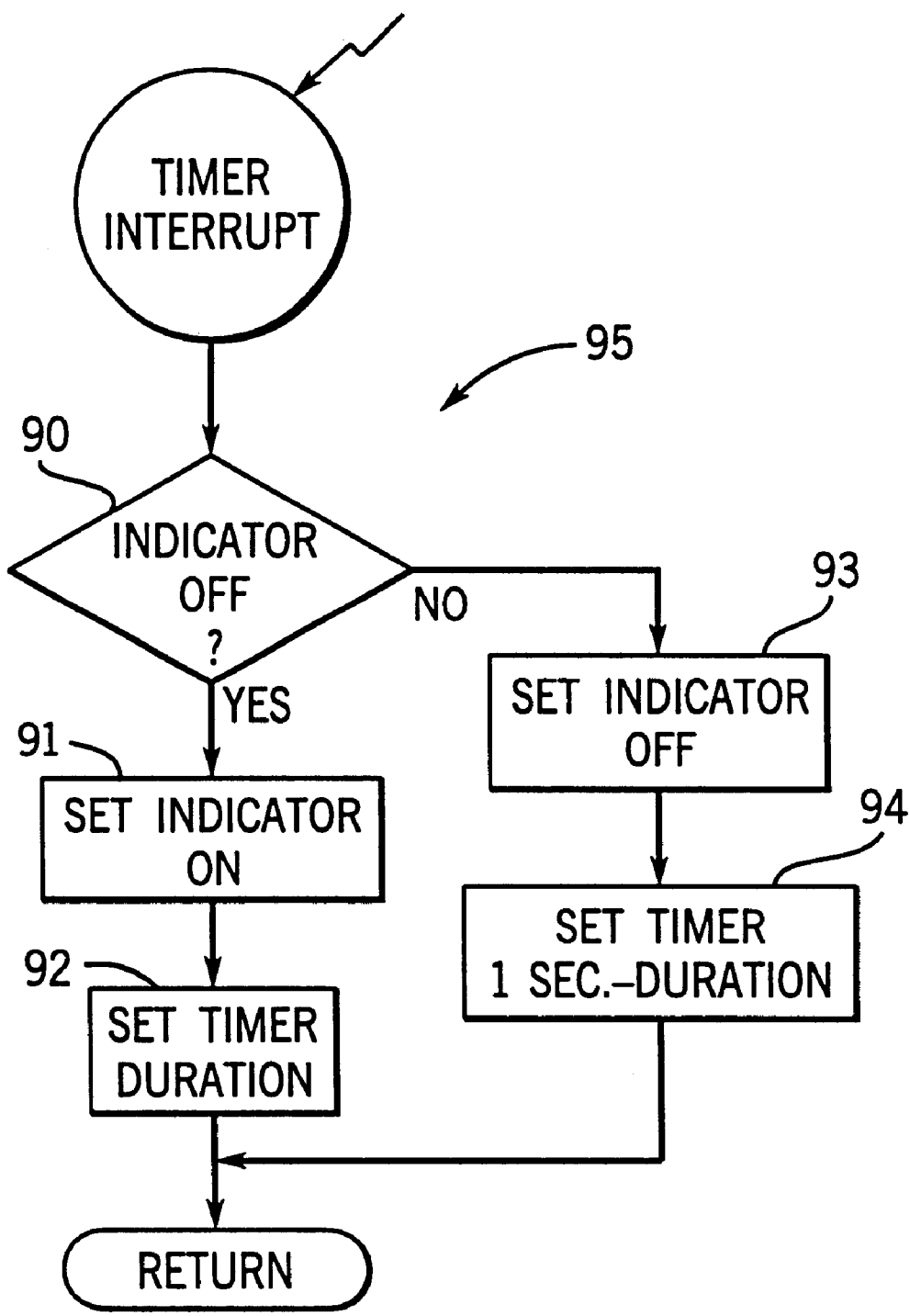
FIG. 6 is a flowchart of how the alignment indicator may operate under interrupt control.

As an alternative, the repetition rate of the sensing function may be increased by operating the timer function under interrupt control, as is well known to software practitioners. With reference to FIG. 6, the interrupt routine 95 is entered every time the timer reaches zero count, This embodiment allows the alignment display function to operate independently of the detection function, for example, the sensing function cycles 1000 times per second, and the PWM function cycles once per second. The interrupt routine 95 is entered as a result of the timer reaching zero count. At step 90, if the alignment display indicator is off, it turns on at step 91 and the timer is set to the required duration at step 92. However, when the alignment display indicator is found to be on at step 90, it is turned off at step 93 and the timer is set to one second minus the present duration at step 94. After the above steps have been completed, execution exits the interrupt routine and returns to the main program. When the interrupt approach is implemented, steps 56–66 in FIG. 3 are omitted. Additionally, the default duration of step 48 should be step to a minimum value (e.g. one) to ensure that the timer runs and an initial value is loaded into the timer at step 40, thereby ensuring that the interrupt routine 95 is initiated.

The present PWM indication method may operate in two distinct modes with a repetition rate that results in perceptible flashing of the indicator LED 30 as described above, or in an analog mode where the repetition rate is sufficiently fast that the eye effectively integrates the flashes to a constant average brightness dependent upon the ratio of on-time to repetition rate. As this ratio tends towards unity, the perceived luminance of alignment indicator LED 30 approaches full brightness. Thus the intensity of the LED 30 then is a function of the intensity of light beam 16 on the photodetector 18.

This latter mode of operation is performed by alignment sensing system 70 of FIG. 5 which has identical detection components to the systems 10 and 35 previously described as indicated by like reference numerals. In this embodiment, the microcomputer 72 includes an internal PWM circuit that drives the second output 74 in response to execution of an alignment software routine. A filter 76, provided by resistor 78 and capacitor 77, has a time constant selected to substantially smooth the output of the PWM circuit. Consequently the voltage on the capacitor 77 is nominally the average value of the PWM circuit's output waveform. The voltage V across capacitor 77 is applied to the base of transistor 82 and determines the current I through resistor 84 according to the approximate formula: $I(R_{84})=(V_{C77}-0.6)/R_{84}$, where $R_{84}$ is the resistance of resistor 84 and $V_{C77}$ is the voltage on capacitor 77. Thus transistor 82 and resistor 84 form a voltage to current converter. This current is nominally the same as the current through indicator LED 80, consequently the luminance of the light emitted by the LED is a direct function of the current and is controlled by the PWM circuit. The average voltage at the base of transistor 82, and hence the average current determining the brightness of indicator LED 30 is effectively a function of the ratio of high signal level duration to the period of the waveform at the second output port 74. Consequently the luminance of the LED 30 is determined by the intensity of the light incident on the photodetector 18.

The software routine that is executed by the microcomputer 72 is essentially the same as depicted by the flowchart of FIG. 3. However, steps 56–66 are replaced by steps which load the internal PWM circuit with the value of the DURATION variable and then delay for a period that is sufficient to loop through the routine at the desired execution frequency, once a second for example.

This analog mode preferably requires a higher frequency of operation of the PWM circuit such that large values of the filter network resistor 78 and capacitor 77 are not required. The eye does not perceive the small variations in brightness as the illumination from LED 30 follows the small variations in current forced by the voltage variations on capacitor 77. The higher the frequency of operation, then the smaller the amount of ripple and hence variation in luminance.

Because the internal PWM of microcomputer 72 operates independently of the sensor function, the frequency of the sensing function is independent of the repetition frequency of the PWM circuit. Consequently the sensor may operate with a much greater repetition rate, for example emitting 1000 light pulses per second with the software simply acting to update the duration value of the PWM circuit. That duration may be chosen to operate with a low repetition of once per second as before. However this requires relatively large component values for filter 76 to give a pulsating sense to the display, A higher repetition frequency requires smaller filter component values and gives an analog sense to the display,

What is claimed is:

1. A photoelectric detecting and indicating apparatus, comprising:

a light detector to receive light and respond by producing a detector signal indicative of intensity of the received light;

a control circuit connected to receive the detector signal and operative in response thereto to produce an output signal having a constant frequency and pulses which vary in duration with the intensity of the received light; and an indicator connected to receive the output signal and operative in response thereto to produce a repetitive, human perceptible indication whereby the intensity of the received light may be discerned.

2. The apparatus as recited in claim 1 wherein the light detector comprises at least one photodetector in series with an amplifier circuit which operates to increase the detector signal to an operable level.

3. The apparatus as recited in claim 1 wherein the indicator comprises a light emitter which flashes at constant frequency with each flash having a length indicative of the intensity of the received light.

4. The apparatus as recited in claim 1 wherein the indicator is a light emitter which illuminates in response to the output signal, whereby the intensity of the received light, and thus alignment of the photoelectric sensor, is indicated by luminance of the light emitter.

5. The apparatus as recited in claim 1 wherein the indicator is a sound emitter which produces audible pulses at constant frequency with each pulse having a length indicative of the intensity of the received light.

6. The apparatus as recited in claim 1 wherein the control circuit comprises a pulse width modulator operable in response to the intensity signal to produce the output signal.

7. The apparatus as recited in claim 1 further comprising an emitter to produce a light beam which impinges the light detector.

8. The apparatus as recited in claim 1 further comprising an emitter to produce a light beam which impinges the light detector, wherein the emitter is operated by the control circuit.

9. A photoelectric sensor having an alignment indicating mechanism, the photoelectric sensor comprising:

a light detector to receive light pulses and produce an detector signal indicative of intensity of the received light pulses;

an amplifier connected to the light detector to increase the detector signal to an operable level;

a control circuit connected to the amplifier and responsive to the increased detector signal to produce an output signal having a constant frequency and pulses which vary in duration with the intensity of the received light; and an indicator connected to the control circuit and producing a human perceptible indication upon activation by the pulses of the output signal, whereby the intensity of the received light and thus alignment of the photoelectric sensor.

10. The photoelectric sensor as recited in claim 9 wherein the light detector comprises at least one photodetector operative to produce a modulated intensity signal, the amplitude of which is indicative of the intensity of the light pulses received.

11. The photoelectric sensor as recited in claim 9 wherein the indicator comprises a light emitter.

12. The photoelectric sensor as recited in claim 9 wherein the control circuit comprises a pulse width modulator that is operable in response to voltage of the increased intensity signal to produce the output signal having a constant frequency and pulses which vary in duration with the voltage of the increased intensity signal.

13. An alignment indicating apparatus for a photoelectric sensor, wherein the alignment indicating apparatus comprises:

a light detector for receiving light pulses from the photoelectric sensor and producing a detector signal indicative of intensity of the received light pulses;

an amplifier connected to the light detector to increase the detector signal to an operable level;

a control circuit connected to the amplifier to receive an amplified detector signal and operative in response thereto to produce an output signal which has a constant frequency and has pulses which vary in duration with the intensity of the received light; and an indicator connected to the control circuit and illuminating in response to the output signal, whereby the intensity of the received light, and thus alignment of the photoelectric sensor, is indicated by luminance of the indicator.

14. The apparatus as recited in claim 13 wherein the light detector comprises at least one photodetector in series with an amplifier which operates to increase the detector signal to an operable level.

15. The apparatus as recited in claim 13 wherein the output comprises a PWM generating pulses having a duration at constant frequency that varies in response to the intensity signal.

16. The apparatus as recited in claim 13 wherein the control circuit comprises a filter that is operative in response to the detector signal to produce a DC voltage which is converted to a current level by a voltage to current converter.

17. The apparatus as recited in claim 16 wherein luminance of the indicator is in response to the current.

18. The apparatus as recited in claim 13 wherein the indicator comprises a light emitting diode producing a luminance indicative of the intensity of the received light.

* * * * *